United States Patent
Wu (10) Patent No.: US 11,711,852 B2
(45) Date of Patent: Jul. 25, 2023

(54) RANDOM ACCESS METHOD AND TERMINAL DEVICE

(71) Applicant: VIVO MOBILE COMMUNICATION CO., LTD., Guangdong (CN)

(72) Inventor: Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/164,383

(22) Filed: Feb. 1, 2021

(65) Prior Publication Data

US 2021/0160928 A1    May 27, 2021

Related U.S. Application Data

(63) Continuation of application No. PCT/CN2019/096738, filed on Jul. 19, 2019.

(30) Foreign Application Priority Data

Aug. 7, 2018 (CN) .......................... 201810892532.9

(51) Int. Cl.
    *H04W 74/08* (2009.01)
    *H04W 74/02* (2009.01)
    (Continued)

(52) U.S. Cl.
    CPC ....... *H04W 74/0833* (2013.01); *H04L 1/1819* (2013.01); *H04L 1/1835* (2013.01); *H04W 74/02* (2013.01); *H04W 80/02* (2013.01)

(58) Field of Classification Search
    CPC ..... H04W 74/02; H04W 74/04; H04W 74/08; H04W 74/0833; H04W 80/00;
    (Continued)

(56) References Cited

U.S. PATENT DOCUMENTS

2009/0259910 A1  10/2009  Lee et al.
2010/0111067 A1   5/2010  Wu
(Continued)

FOREIGN PATENT DOCUMENTS

CN    102264098 A    11/2011
CN    102342167 A     2/2012
(Continued)

OTHER PUBLICATIONS

EP Search Report in Application No. 19848732.4 dated Aug. 26, 2021.
(Continued)

*Primary Examiner* — Peter Chen
(74) *Attorney, Agent, or Firm* — Maschoff Brennan (57) ABSTRACT

The present disclosure provides a random access method and a terminal device. The method includes: reserving a first MAC PDU buffered in a HARQ buffer or buffering a second MAC PDU in a HARQ buffer if a random access procedure is successful, where the first MAC PDU is a PDU that is buffered in a Msg3 buffer in a contention random access procedure, the second MAC PDU is a PDU that includes at least data content of the first MAC PDU and is buffered in a target buffer, and the target buffer and the Msg3 buffer are different buffers.

15 Claims, 2 Drawing Sheets

(51) Int. Cl.
*H04W 80/02* (2009.01)
*H04L 1/1812* (2023.01)
*H04L 1/1829* (2023.01)

(58) Field of Classification Search
CPC ..... H04W 80/02; H04W 28/10; H04W 28/12; H04W 28/14; H04W 76/20; H04W 76/25; H04W 76/27; H04W 72/0406; H04W 88/02; H04L 1/18; H04L 1/1812; H04L 1/1816; H04L 1/1819; H04L 1/1835; H04L 1/1825; H04L 1/1864; H04L 1/1896; H04L 1/1822
See application file for complete search history.

(56) References Cited

U.S. PATENT DOCUMENTS

| | | | |
|---|---|---|---|
| 2010/0169733 | A1 | 7/2010 | Kim et al. |
| 2011/0261763 | A1 | 10/2011 | Chun et al. |
| 2012/0314672 | A1 | 12/2012 | Chen |
| 2013/0258862 | A1 | 10/2013 | Dinan |
| 2018/0013521 | A1* | 1/2018 | Lee .................. H04L 1/1851 |
| 2018/0070382 | A1 | 3/2018 | Lee et al. |
| 2018/0310201 | A1* | 10/2018 | Lee .................. H04L 1/1874 |
| 2020/0119860 | A1* | 4/2020 | Shi .................. H04L 1/1874 |

FOREIGN PATENT DOCUMENTS

| | | |
|---|---|---|
| CN | 104539404 A | 4/2015 |
| CN | 105307154 A | 2/2016 |
| EP | 3 206 321 A1 | 8/2017 |
| JP | 2014-112919 A | 6/2014 |
| KR | 10-2009-0109068 A | 10/2009 |
| WO | 2016/122162 A1 | 8/2016 |

OTHER PUBLICATIONS

CN Office Action in Application No. 201810892532.9 dated Mar. 19, 2021.
"UE switch from CBRA to CFRA and possible issues" 3GPP TSG-RAN WG2 Ah 1807, Tdoc R2-1810084, Ericsson, Jul. 2, 2018.
"Msg3 handling when switching from CBRA to CFRA" 3GPP TSG-RAN WG2 Meeting NR Adhoc 1807, R2-1810157, Nokia, Nokia Shanghai Bell, Jul. 2, 2018.
Written Opinion and International Search Report in Application No. PCT/CN2019/096738 dated Feb. 18, 2021.
IN Office Action in Application No. 202127009314 dated Jan. 27, 2022.
JP Office Action in Application No. 2021-506281 dated Apr. 19, 2022.
"Msg3 problem in switching between CBRA and CFRA" 3GPP TSG-RAN WG2 NR Ad hoc 1807, LG Electronics Inc., R2-1810686, Jul. 2, 2018.
KR Office Action dated Feb. 13, 2023 as received in Application No. 10-2021-7006769.
JP Office Action dated May 23, 2023 as received in Application No. 2021-506281.

* cited by examiner

FIG. 1

Reserve a first MAC PDU buffered in a HARQ buffer or buffer a second MAC PDU in a HARQ buffer if a random access procedure is successful — 201

RANDOM ACCESS METHOD AND TERMINAL DEVICE

CROSS-REFERENCE TO RELATED APPLICATIONS

This application is a continuation application of International Application No. PCT/CN2019/096738 filed on Jul. 19, 2019, which claims priority to Chinese Patent Application No. 201810892532.9, filed with the Chinese Patent Office on Aug. 7, 2018, both disclosures of which are incorporated herein by reference in their entireties.

TECHNICAL FIELD

The present disclosure relates to the field of communications technologies, and in particular, to a random access method and a terminal device.

RELATED ART

For each time when user equipment (User Equipment, UE) initiates (or re-initiates) a random access procedure, a random access resource is selected based on reference symbol received power (RSRP) of every downlink signal (for example, Synchronous Signal Block, SSB) associated with a random access Msg1 resource, to improve the success rate of random access. Therefore, at each time when the UE initiates (or re-initiates) a random access procedure, the UE may select a contention-based random access procedure, or may select a contention-free-based random access procedure.

When performing a random access procedure, if a contention-based random access procedure is previously performed, the UE generates a medium access control protocol data unit (Medium Access Control Protocol Data Unit, MAC PDU), buffers the MAC PDU in a Msg3 buffer, and transmits, by using a HARQ procedure, the MAC PDU buffered in the Msg3 buffer. When the UE re-initiates the random access procedure, if random access is successful, and the UE considers that the random access procedure is completed, a HARQ buffer used for transmitting a MAC PDU of the Msg3 is flushed, resulting in a failure in transmitting the MAC PDU of the Msg3 and a loss of a data packet.

In the related art, currently, an effective solution has not been proposed to resolve a problem that data is lost during transmission because the MAC PDU of the Msg3 buffered in the HARQ buffer is flushed when the random access procedure is completed.

SUMMARY

According to a first aspect, an embodiment of the present disclosure provides a random access method. The method includes:

reserving a first MAC PDU buffered in a HARQ buffer or buffering a second MAC PDU in a HARQ buffer if a random access procedure is successful, where the first MAC PDU is a PDU that is buffered in a Msg3 buffer in a contention random access procedure, the second MAC PDU is a PDU that includes at least data content of the first MAC PDU and is buffered in a target buffer, and the target buffer and the Msg3 buffer are different buffers.

According to a second aspect, an embodiment of the present disclosure further provides a terminal device. The terminal device includes:

a processing module, configured to reserve a first MAC PDU buffered in a HARQ buffer or buffer a second MAC PDU in a HARQ buffer if a random access procedure is successful, where the first MAC PDU is a PDU that is buffered in a Msg3 buffer in a contention random access procedure, the second MAC PDU is a PDU that includes at least data content of the first MAC PDU and is buffered in a target buffer, and the target buffer and the Msg3 buffer are different buffers.

According to a third aspect, an embodiment of the present disclosure further provides a terminal device, including a processor, a memory, and a computer program that is stored in the memory and that can run on the processor. When the computer program is executed by the processor, steps of the foregoing random access method are implemented.

According to a fourth aspect, an embodiment of the present disclosure further provides a computer-readable storage medium. The computer-readable storage medium stores a computer program, and when the computer program is executed by a processor, steps of the foregoing random access method are implemented.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

For ease of description, the following describes some terms in the embodiments of the present disclosure.

Random Access Procedure:

The random access procedure may mainly include a contention-based random access procedure (also referred to as a contention random access procedure) and a contention-free-based random access procedure (also referred to as a contention-free random access procedure).

In the contention-based random access procedure, user equipment (User Equipment, UE) transmits a Msg1 (that is, a random access request) to a network side device. After receiving the Msg1, the network side device transmits a Msg2 (that is, a random access response (Random Access Response, RAR)) to the UE, where the Msg2 carries uplink grant (Uplink Grant, UL Grant for short) information. The UE performs, based on the uplink grant in the Msg2, multiplexing and assembly function of a medium access control (Medium Access Control, MAC) layer to generate a protocol data unit (Protocol Data Unit, MAC PDU), and stores the MAC PDU in a Msg3 buffer. Then, the UE transmits the MAC PDU in the Msg3 buffer by using a hybrid automatic repeat request (Hybrid Automatic Repeat Request, HARQ) procedure. The network side device transmits a Msg4 (for example, a contention resolution identity) to the UE after receiving the Msg3.

The UE receives the Msg4 to determine whether contention resolution is successful. If the contention resolution is successful, the random access procedure is successful. Otherwise, the UE re-initiates the random access procedure. In the re-initiated random access procedure, after the UE receives the uplink grant (Uplink Grant) in the Msg2, the UE may directly obtain the previously stored MAC PDU from the Msg3 buffer and transmit the MAC PDU by using the HARQ procedure. After completing the random access procedure, the UE flushes the HARQ buffer for transmission of the Msg3 in the random access procedure.

In the contention-free-based random access procedure, UE transmits a Msg1 (that is, a random access request) to a network side device. After receiving the Msg1, the network side device transmits a Msg2 (that is, RAR) to the UE, where the Msg2 carries uplink grant (Uplink Grant) information and identifier information of the UE (for example, a number of a random access preamble (Preamble) of the Msg1). If the number of the random access preamble is the same as a number of a random access preamble for transmission of the Msg1 of the UE, the UE considers that the random access procedure is successful; otherwise, the UE re-initiates the random access procedure.

Figure 1:
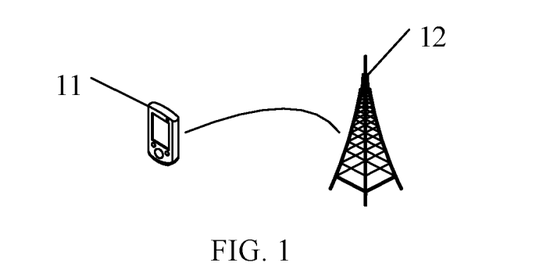
FIG. 1 is a structural diagram of a network system to which an embodiment of the present disclosure may be applied.

Referring to FIG. 1, FIG. 1 is a structural diagram of a network system to which an embodiment of the present disclosure may be applied. As shown in FIG. 1, the network system includes a terminal device 11 and a network side device 12. The terminal device 11 may be a terminal side device such as a mobile phone, a tablet computer (Tablet Personal Computer), a laptop computer (Laptop Computer), a personal digital assistant (Personal Digital Assistant, PDA for short), a mobile internet device (Mobile Internet Device, MID), or a wearable device (Wearable Device). It should be noted that a specific type of the terminal device 11 is not limited in this embodiment of the present disclosure. The network side device 12 may be a base station, for example, a macro base station, an LTE eNB, a 5G NR NB, or a gNB. The network side device 12 may be alternatively a small cell, for example, a low power node (Low Power Node, LPN) pico or a femto, or the network side device 12 may be an access point (Access Point, AP). The base station may be alternatively a network node that includes a central unit (Central Unit, CU) and a plurality of transmission reception points (Transmission Reception Point, TRP) that are managed and controlled by the central unit. It should be noted that a specific type of the network side device 12 is not limited in this embodiment of the present disclosure.

In this embodiment of the present disclosure, if a random access procedure is successful, the terminal device 11 may reserve a first MAC PDU buffered in a HARQ buffer, where the first MAC PDU may be a PDU that is buffered in a Msg3 buffer in a contention random access procedure.

The reserving a first MAC PDU buffered in a HARQ buffer may mean not flushing the first MAC PDU buffered in the HARQ buffer (that is, not performing an operation of flushing the first MAC PDU buffered in the HARQ buffer) or preventing flushing of the first MAC PDU buffered in the HARQ buffer, to keep the first MAC PDU stored in the HARQ buffer.

In this implementation, the first MAC PDU buffered in the HARQ buffer is reserved if the random access procedure is successful, so that the terminal device 11 can continue transmitting the first MAC PDU to the network side device 12 based on the first MAC PDU buffered in the HARQ buffer. In comparison with the prior art in which the first MAC PDU buffered in the HARQ buffer is flushed if the random access procedure is successful, a probability that data content of the first MAC PDU fails to be sent is reduced, and a loss of data transmitted in the random access procedure is reduced.

Optionally, in this embodiment of the present disclosure, the terminal device 11 may buffer a second MAC PDU in the HARQ buffer if the random access procedure is successful, where the second MAC PDU is a PDU that includes at least data content of the first MAC PDU and is buffered in a target buffer, and the target buffer and the Msg3 buffer are different buffers.

The data content of the first MAC PDU may be data content that the terminal device 11 actually needs to transmit by using the first MAC PDU, for example, data content before the first MAC PDU is packed. The second MAC PDU includes at least the data content of the first MAC PDU, so that the data content of the first MAC PDU can be further transmitted based on the second MAC PDU.

The target buffer may be any buffer different from the Msg3 buffer, for example, a Msg1 buffer, and a buffer for retransmitting the data content of the first MAC PDU. This is not limited in this implementation of the present disclosure. Because the second MAC PDU is not stored in the Msg3 buffer, the terminal device 11 can be prevented from flushing the second MAC PDU buffered in the HARQ buffer after the random access is successful.

It may be understood that in this implementation, the terminal device 11 may flush the first MAC PDU buffered in the HARQ buffer or may reserve the first MAC PDU if the random access procedure is successful.

In this implementation, the second MAC PDU is buffered in the HARQ buffer if the random access procedure is successful, so that the terminal device 11 can continue transmitting the data content of the first MAC PDU to the network side device 12 based on the second MAC PDU buffered in the HARQ buffer. In comparison with the prior art in which the first MAC PDU buffered in the HARQ buffer is flushed if the random access procedure is successful, a probability that the data content of the first MAC PDU fails to be sent is reduced, and a loss of data transmitted in the random access procedure is reduced.

It should be noted that, that the random access procedure is successful may be that a contention-free random access procedure is successful, or may be that a contention random access procedure is successful.

Figure 2:
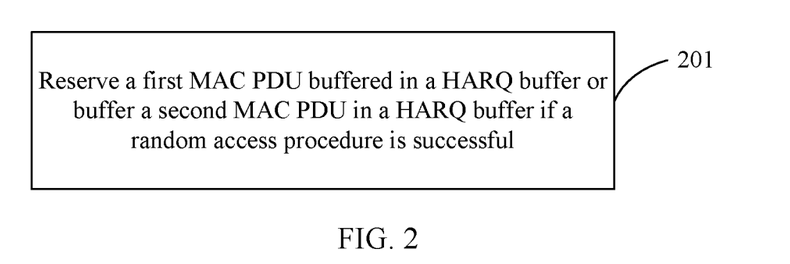
FIG. 2 is a flowchart of a random access method according to an embodiment of the present disclosure.

An embodiment of the present disclosure provides a random access method, applied to a terminal device. Referring to FIG. 2, FIG. 2 is a flowchart of a random access method according to an embodiment of the present disclosure. As shown in FIG. 2, the method includes the following steps.

Step 201: Reserve a first MAC PDU buffered in a HARQ buffer or buffer a second MAC PDU in a HARQ buffer if a random access procedure is successful.

The first MAC PDU is a PDU that is buffered in a Msg3 buffer in a contention random access procedure, the second MAC PDU is a PDU that includes at least data content of the first MAC PDU and is buffered in a target buffer, and the target buffer and the Msg3 buffer are different buffers.

In this embodiment of the present disclosure, the random access procedure may be a contention-free random access procedure. For example, after a contention random access procedure fails, a contention-free random access procedure may be initiated, and the first MAC PDU buffered in the HARQ buffer may be reserved or the second MAC PDU may be buffered in the HARQ buffer if a random access request identifier indicated by a received Msg2 corresponds to a random access request sent by UE (also referred to as a terminal device).

Optionally, the random access procedure may be alternatively a contention random access procedure. For example, after a Msg4 is received, it may be determined, based on the Msg4, whether contention resolution is successful, and the first MAC PDU buffered in the HARQ buffer may be reserved or the second MAC PDU may be buffered in the HARQ buffer if the contention resolution is successful.

The reserving a first MAC PDU buffered in a HARQ buffer may mean not flushing the first MAC PDU buffered in the HARQ buffer (that is, not performing an operation of flushing the first MAC PDU buffered in the HARQ buffer) or preventing flushing of the first MAC PDU buffered in the HARQ buffer, to keep the first MAC PDU stored in the HARQ buffer.

The data content of the first MAC PDU may be data content that the terminal device actually needs to transmit by using the first MAC PDU, for example, data content before the first MAC PDU is packed. The second MAC PDU includes at least the data content of the first MAC PDU, so that the data content of the first MAC PDU can be further transmitted based on the second MAC PDU.

The target buffer may be any buffer different from the Msg3 buffer, for example, a Msg1 buffer, and a buffer for retransmitting the data content of the first MAC PDU. This is not limited in this implementation of the present disclosure. Because the second MAC PDU is not stored in the Msg3 buffer, the terminal device can be prevented from flushing the second MAC PDU buffered in the HARQ buffer after the random access is successful.

In this embodiment of the present disclosure, the first MAC PDU buffered in the HARQ buffer may be reserved or the second MAC PDU may be buffered in the HARQ buffer if the random access procedure is successful, so that the data content of the first MAC PDU (a MAC PDU of a Msg3) can be further sent to a network side device based on the first MAC PDU or the second MAC PDU buffered in the HARQ buffer. In comparison with the prior art in which the first MAC PDU buffered in the HARQ buffer is flushed if the random access procedure is successful, a probability that the data content of the first MAC PDU fails to be sent is reduced, and a loss of data transmitted in the random access procedure is reduced, thereby improving data transmission reliability.

Optionally, the reserving a first MAC PDU buffered in a HARQ buffer or buffering a second MAC PDU in a HARQ buffer if a random access procedure is successful in step 201 includes:

reserving the first MAC PDU buffered in the HARQ buffer or buffering the second MAC PDU in the HARQ buffer if a contention-free random access procedure is successful.

The following describes this embodiment of the present disclosure with reference to an example.

In a contention-based random access procedure (also referred to as a contention random access procedure), the UE generates a MAC PDU (the first MAC PDU) for transmission of the Msg3, stores the first MAC PDU in the Msg3 buffer, and transmits data of the first MAC PDU by using a HARQ procedure. For example, the first MAC PDU is stored in a buffer of the HARQ procedure, and then the data is sent by using the HARQ procedure.

The UE re-initiates a random access request (for example, a Msg1) when determining that the contention-based random access procedure fails (for example, contention resolution fails), and a resource of the random access request is a contention-free-based random access resource, that is, initiates a contention-free random access procedure. The UE may reserve the first MAC PDU buffered in the HARQ buffer or buffer the second MAC PDU in the HARQ buffer when receiving the corresponding Msg2 (for example, a random access request identifier indicated by a random access response corresponds to the random access request sent by the UE), so that the data content of the first MAC PDU (the MAC PDU of the Msg3) can be further sent to the network side device based on the first MAC PDU or the second MAC PDU buffered in the HARQ buffer.

In this embodiment of the present disclosure, the first MAC PDU buffered in the HARQ buffer may be reserved or the second MAC PDU may be buffered in the HARQ buffer if the contention-free random access procedure is successful, so that the data content of the first MAC PDU (the MAC PDU of the Msg3) can be further sent to the network side device based on the first MAC PDU or the second MAC PDU buffered in the HARQ buffer, thereby reducing a probability that the data content of the first MAC PDU fails to be sent and reducing a loss of data transmitted in the random access procedure.

Optionally, after the reserving a first MAC PDU buffered in a HARQ buffer or buffering a second MAC PDU in a HARQ buffer in step 201, the method further includes:

transmitting a target MAC PDU to a network side device by using a HARQ procedure until a transmission stopping condition is met, where the target MAC PDU includes either the first MAC PDU or the second MAC PDU.

In this embodiment of the present disclosure, the transmission stopping condition may be predefined in a protocol, or may be configured by a network side. Optionally, the transmission stopping condition may include at least one of the following:

a response corresponding to HARQ transmission of a Msg3 is received;

the maximum HARQ transmission times of the Msg3 is reached; and the HARQ procedure is occupied by first data, where the first data is different from the target MAC PDU.

In this embodiment of the present disclosure, if random access is successful, the terminal device may continue transmitting the target MAC PDU to the network side device by using the HARQ procedure until at least one of the following is met: the response corresponding to the HARQ transmission of the Msg3 (that is, an ACK feedback of the HARQ transmission of the Msg3) is received, the maximum HARQ transmission times of the Msg3 is reached, and the HARQ procedure is occupied by other data (that is, the first data). The other data may be any data different from the target MAC PDU.

It may be understood that, the terminal device may reserve the target MAC PDU buffered in the HARQ buffer or may flush the target MAC PDU after the transmission stopping condition is met.

In this embodiment of the present disclosure, the target MAC PDU is sent to the network side device by using the HARQ procedure until the transmission stopping condition is met, so that a probability that the data content of the first MAC PDU fails to be sent can be further reduced and a loss of data transmitted in the random access procedure can be reduced.

Optionally, after the transmitting a target MAC PDU to a network side device by using a HARQ procedure until a transmission stopping condition is met, the method further includes:

if the transmission stopping condition is met, flushing the target MAC PDU buffered in the HARQ buffer.

In this embodiment of the present disclosure, if the transmission stopping condition is met, the target MAC PDU buffered in the HARQ buffer is flushed, thereby reducing occupation of the HARQ buffer and further reducing occupation of a system resource.

Optionally, before the buffering a second MAC PDU in a HARQ buffer in step 201, the method further includes:

generating the second MAC PDU based on the data content of the first MAC PDU;

and storing the second MAC PDU in the target buffer.

In this embodiment of the present disclosure, when random access is successful, a new MAC PDU (the second MAC PDU) may be generated based on the data content of the first MAC PDU, and the generated new MAC PDU is stored in the target buffer. The target buffer may be any buffer different from the Msg3 buffer, for example, a Msg1 buffer, and a buffer for retransmitting the data content of the first MAC PDU.

Optionally, in this embodiment of the present disclosure, the second MAC PDU may be generated based on data content of the first MAC PDU buffered at a MAC layer or data content of the first MAC PDU retransmitted by using a MAC layer instructing a higher layer, for example, data content of the first MAC PDU retransmitted by using the MAC layer instructing a radio link control (Radio Link Control, RLC) layer, a packet data convergence protocol (Packet Data Convergence Protocol, PDCP) layer, or a service data adaptation protocol (Service Data Adaptation Protocol, SDAP).

In this embodiment of the present disclosure, the newly generated second MAC PDU is stored in the target buffer, so that the terminal device can be prevented from flushing the second MAC PDU buffered in the HARQ buffer after the random access is successful.

The random access method provided in this embodiment of the present disclosure is described below with reference to an example.

Step a: In a contention-based random access procedure (also referred to as a contention random access procedure), UE generates a MAC PDU (a first MAC PDU) for transmission of the Msg3, stores the first MAC PDU in a Msg3 buffer, and transmits data of the first MAC PDU by using a HARQ procedure.

For example, the first MAC PDU is stored in a buffer of the HARQ procedure, and then the data is sent by using the HARQ procedure.

Step b: The UE re-initiates a random access request (for example, a Msg1) when determining that the contention-based random access procedure fails (for example, contention resolution fails), and a resource of the random access request is a contention-free-based random access resource, that is, initiates a contention-free random access procedure.

Step c: The UE may perform any one of the following processing processes when receiving a corresponding Msg2 (for example, a random access request identifier indicated by a random access response corresponds to the random access request sent by the UE):

Processing procedure 1: The UE considers that a random access procedure is completed, and may transmit, by using the HARQ procedure, the first MAC PDU buffered in the Msg3 buffer.

For example, for the contention-free-based random access procedure, after the random access procedure is completed, the UE transmits the MAC PDU (the first MAC PDU) of the Msg3 by using the HARQ procedure until a response (that is, an ACK feedback) corresponding to HARQ transmission of the Msg3 is received, or the maximum HARQ transmission times of the Msg3 is reached, or the HARQ procedure is occupied by other data.

In this implementation, when the end of the random access procedure is the end of the contention-free-based random access procedure, the first MAC PDU buffered in the HARQ buffer is not flushed. In other words, only when the end of the random access procedure is the end of the contention-based random access procedure, the UE flushes the HARQ buffer corresponding to the transmission of the Msg3, that is, flushes the first MAC PDU buffered in the HARQ buffer.

Processing procedure 2: After completing transmission of the MAC PDU (the first MAC PDU) of the Msg3 by using the HARQ procedure, the UE may consider that the random access procedure is completed.

For example, in the contention-free-based random access procedure, the UE transmits the MAC PDU (the first MAC PDU) of the Msg3 by using the HARQ procedure. After completing data transmission of the HARQ procedure (for example, an ACK feedback of HARQ transmission of the Msg3 is received, or the maximum HARQ transmission times of HARQ transmission of the Msg3 is reached, or the HARQ procedure is occupied by other data), the UE considers that the random access procedure is completed. In this case, the UE may flush the first MAC PDU buffered in the HARQ buffer.

In this implementation, it is considered that the random access procedure is completed only after the MAC PDU (the first MAC PDU) of the Msg3 is transmitted by using the HARQ procedure, and the first MAC PDU buffered in the HARQ buffer may be flushed.

Processing procedure 3: The UE considers that the random access procedure is completed, and transmits a regenerated new MAC PDU (the second MAC PDU) by using the HARQ procedure.

For example, the UE may regenerate the new MAC PDU (the second MAC PDU) in the contention-free-based random access procedure, where the new MAC PDU is not stored in the Msg3 buffer. After completing the random access procedure, the UE may transmit the second MAC PDU by using the HARQ procedure until an ACK feedback of HARQ transmission is received, or the maximum HARQ transmission times of HARQ transmission is reached, or the HARQ procedure is occupied by other data.

According to the random access method provided in this embodiment of the present disclosure, a loss of data transmitted in a random access procedure can be avoided, thereby improving data transmission reliability.

Figure 3:
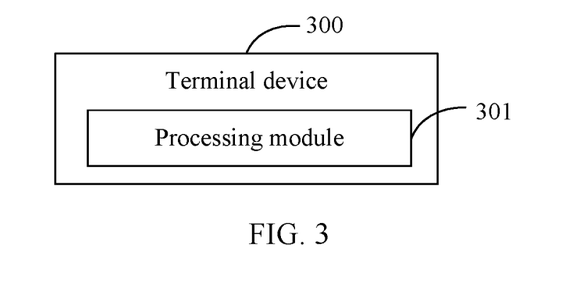
FIG. 3 is a structural diagram of a terminal device according to an embodiment of the present disclosure.

Referring to FIG. 3, FIG. 3 is a structural diagram of a terminal device according to an embodiment of the present disclosure. As shown in FIG. 3, a terminal device 300 includes:

a processing module 301, configured to reserve a first MAC PDU buffered in a HARQ buffer or buffer a second MAC PDU in a HARQ buffer if a random access procedure is successful, where the first MAC PDU is a PDU that is buffered in a Msg3 buffer in a contention random access procedure, the second MAC PDU is a PDU that includes at least data content of the first MAC PDU and is buffered in a target buffer, and the target buffer and the Msg3 buffer are different buffers.

Optionally, the processing module is specifically configured to:

reserve the first MAC PDU buffered in the HARQ buffer or buffer the second MAC PDU in the HARQ buffer if a contention-free random access procedure is successful.

Optionally, the terminal device further includes:

a transmission module, configured to: after the reserving the first MAC PDU buffered in the HARQ buffer or buffering the second MAC PDU in the HARQ buffer, transmit a target MAC PDU to a network side device by using a HARQ procedure until a transmission stopping condition is met, where the target MAC PDU includes either the first MAC PDU or the second MAC PDU.

Optionally, the terminal device further includes:

a flushing module, configured to: after the transmitting a target MAC PDU to a network side device by using a HARQ procedure until a transmission stopping condition is met, if the transmission stopping condition is met, flush the target MAC PDU buffered in the HARQ buffer.

Optionally, the transmission stopping condition includes at least one of the following:

a response corresponding to HARQ transmission of a Msg3 is received;

the maximum HARQ transmission times of the Msg3 is reached; and the HARQ procedure is occupied by first data, where the first data is different from the target MAC PDU.

Optionally, the terminal device further includes:

a generation module, configured to: before the buffering a second MAC PDU in a HARQ buffer, generate the second MAC PDU based on the data content of the first MAC PDU; and a storage module, configured to store the second MAC PDU in the target buffer.

The terminal device 300 provided in this embodiment of the present disclosure can implement processes implemented by the terminal device in the method embodiment of FIG. 2. To avoid repetition, details are not described herein again.

According to the terminal device 300 in this embodiment of the present disclosure, the processing module 301 is configured to reserve the first MAC PDU buffered in the HARQ buffer or buffer the second MAC PDU in the HARQ buffer if the random access procedure is successful, where the first MAC PDU is a PDU that is buffered in the Msg3 buffer in the contention random access procedure, the second MAC PDU is a PDU that includes at least the data content of the first MAC PDU and is buffered in the target buffer, and the target buffer and the Msg3 buffer are different buffers. In this way, the terminal device can continue transmitting data content of a MAC PDU of a Msg3 if the random access procedure is successful, thereby reducing a loss of data transmitted in the random access procedure and improving data transmission reliability.

Figure 4:
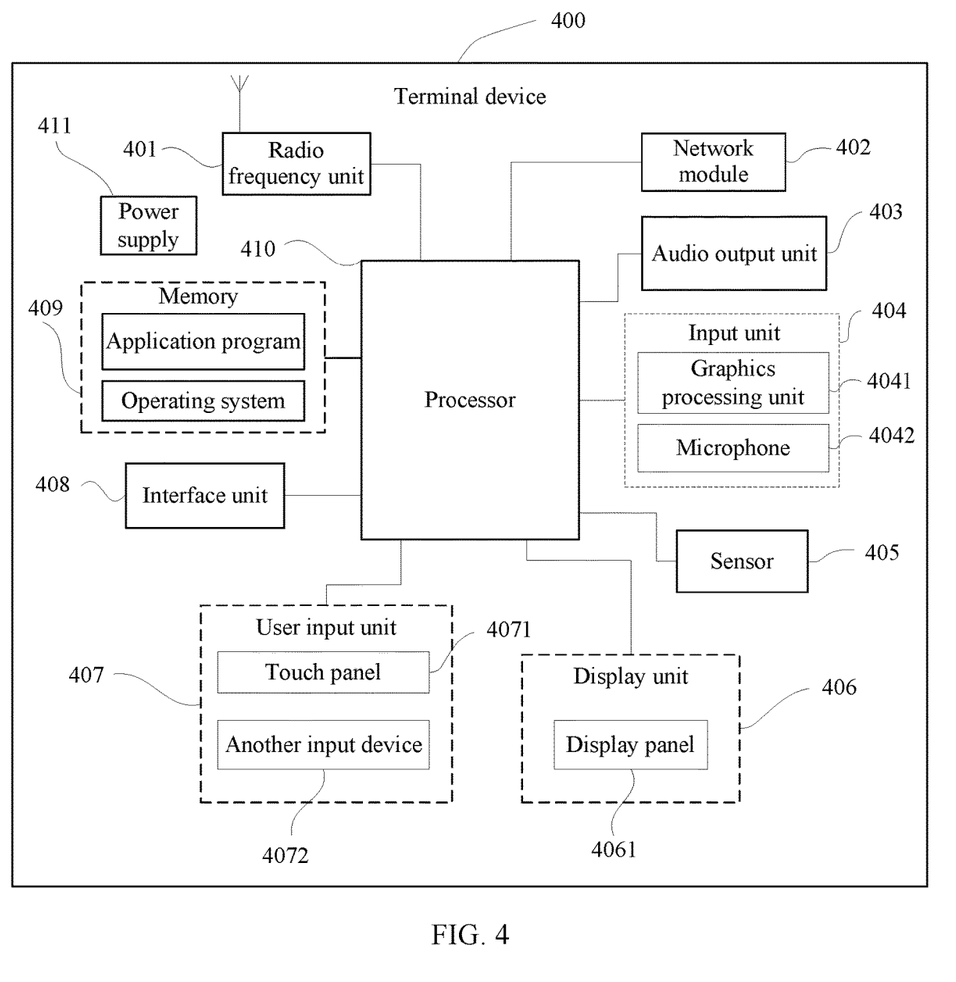
FIG. 4 is a structural diagram of another terminal device according to an embodiment of the present disclosure.

FIG. 4 is a structural diagram of another terminal device according to an embodiment of the present disclosure. As shown in FIG. 4, a terminal device 400 includes but is not limited to components such as a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art may understand that the structure of the terminal device shown in FIG. 4 does not constitute a limitation to the terminal device. The terminal device may include more or fewer components than that shown in the figure, or a combination of some components, or an arrangement of different components. In this embodiment of the present disclosure, the terminal device includes but is not limited to a mobile phone, a tablet computer, a notebook computer, a palmtop computer, a vehicle-mounted terminal, a wearable device, a pedometer, or the like.

The processor 410 is configured to reserve a first MAC PDU buffered in a HARQ buffer or buffer a second MAC PDU in a HARQ buffer if a random access procedure is successful, where the first MAC PDU is a PDU that is buffered in a Msg3 buffer in a contention random access procedure, the second MAC PDU is a PDU that includes at least data content of the first MAC PDU and is buffered in a target buffer, and the target buffer and the Msg3 buffer are different buffers.

In this embodiment of the present disclosure, the first MAC PDU buffered in the HARQ buffer is reserved or the second MAC PDU is buffered in the HARQ buffer if the random access procedure is successful. In this way, the terminal device can continue transmitting data content of a MAC PDU of a Msg3 if the random access procedure is successful, thereby reducing a loss of data transmitted in the random access procedure.

Optionally, the processor 410 is further configured to:

reserve the first MAC PDU buffered in the HARQ buffer or buffer the second MAC PDU in the HARQ buffer if a contention-free random access procedure is successful.

Optionally, the processor 410 is further configured to:

after the reserving the first MAC PDU buffered in the HARQ buffer or buffering the second MAC PDU in the HARQ buffer, transmit a target MAC PDU to a network side device by using a HARQ procedure until a transmission stopping condition is met, where the target MAC PDU includes either the first MAC PDU or the second MAC PDU.

Optionally, the processor 410 is further configured to:

after the transmitting a target MAC PDU to a network side device by using a HARQ procedure until a transmission stopping condition is met, if the transmission stopping condition is met, flush the target MAC PDU buffered in the HARQ buffer.

Optionally, the transmission stopping condition includes at least one of the following:

a response corresponding to HARQ transmission of a Msg3 is received;

the maximum HARQ transmission times of the Msg3 is reached; and the HARQ procedure is occupied by first data, where the first data is different from the target MAC PDU.

Optionally, the processor 410 is further configured to:

before the buffering a second MAC PDU in a HARQ buffer, generate the second MAC PDU based on the data content of the first MAC PDU; and store the second MAC PDU in the target buffer.

It should be understood that, in some embodiments of the present disclosure, the radio frequency unit 401 may be configured to receive and send information or receive and send a signal in a call process. Specifically, after receiving downlink data from a base station, the radio frequency unit 401 sends the downlink data to the processor 410 for processing. In addition, the radio frequency unit 401 sends uplink data to the base station. Generally, the radio frequency unit 401 includes, but is not limited to, an antenna, at least one amplifier, a transceiver, a coupler, a low noise amplifier, a duplexer, and the like. In addition, the radio frequency unit 401 may communicate with a network and another device through a wireless communication system.

The terminal device provides a user with wireless broadband Internet access through the network module 402, for example, helps the user send and receive emails, browse web pages, and access streaming media.

The audio output unit 403 may convert audio data received by the radio frequency unit 401 or the network module 402 or stored in the memory 409 into an audio signal and output the audio signal as a sound. In addition, the audio output unit 403 may further provide audio output (for example, a call signal received voice, or a message received voice) related to a specific function executed by the terminal device 400. The audio output unit 403 includes a speaker, a buzzer, a telephone receiver, and the like.

The input unit 404 is configured to receive an audio signal or a video signal. The input unit 404 may include a graphics processing unit (Graphics Processing Unit, GPU) 4041 and a microphone 4042. The graphics processing unit 4041 processes image data of a static image or video obtained by an image capture apparatus (such as, a camera) in a video capture mode or an image capture mode. A processed image frame may be displayed on the display unit 406. The image frame processed by the graphics processing unit 4041 can be stored in the memory 409 (or another storage medium) or sent via the radio frequency unit 401 or the network module 402. The microphone 4042 can receive sound and can process such sound into audio data. Processed audio data can be converted, in telephone call mode, into a format that can be sent to a mobile communication base station via the radio frequency unit 401 for output.

The terminal device 400 further includes at least one sensor 405, for example, an optical sensor, a motion sensor, and other sensors. Specifically, the optical sensor includes an ambient light sensor and a proximity sensor. The ambient light sensor may adjust luminance of the display panel 4061 based on brightness of ambient light. The proximity sensor may turn off the display panel 4061 and/or backlight when the terminal device 400 approaches an ear. As a type of the motion sensor, an accelerometer sensor may detect an acceleration in each direction (generally, three axes), and detect a value and a direction of gravity when the accelerometer sensor is static, and may be used to recognize a terminal device posture (such as screen switching between landscape and portrait modes, a related game, or magnetometer posture calibration), a function related to vibration recognition (such as a pedometer or a knock), and the like. The sensor 405 may further include a fingerprint sensor, a pressure sensor, an iris sensor, a molecular sensor, a gyroscope, a barometer, a hygrometer, a thermometer, and an infrared sensor. Details are not described herein.

The display unit 406 is configured to display information input by a user or information provided to a user. The display unit 406 may include the display panel 4061, and the display panel 4061 may be configured in a form of a liquid crystal display (Liquid Crystal Display, LCD), an organic light-emitting diode (Organic Light-Emitting Diode, OLED), or the like.

The user input unit 407 may be configured to receive entered digit or character information and generate a key signal input related to user setting and function control of the terminal device. Specifically, the user input unit 407 includes a touch panel 4071 and another input device 4072. The touch panel 4071, also called a touch screen, can collect a touch operation of the user on or near the touch panel 4071 (For example, the user uses any suitable object or accessory such as a finger or a stylus to operate on or near the touch panel 4071). The touch panel 4071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 410, and receives and executes a command sent by the processor 410. In addition, the touch panel 4071 may be of a resistive type, a capacitive type, an infrared type, a surface acoustic wave type, or the like. In addition to the touch panel 4071, the user input unit 407 may further include the another input device 4072. Specifically, the another input device 4072 may include but is not limited to a physical keyboard, function keys (such as a volume control key and a switch key), a trackball, a mouse, and a joystick. Details are not described herein.

Further, the touch panel 4071 can cover the display panel 4061. When detecting a touch operation on or near the touch panel 4071, the touch panel 4071 transmits the touch operation to the processor 410 to determine a type of a touch event. Then the processor 410 provides corresponding visual output on the display panel 4061 based on the type of the touch event. Although in FIG. 4, the touch panel 4071 and the display panel 4061 are configured as two independent components to implement input and output functions of the terminal device, in some embodiments, the touch panel 4071 and the display panel 4061 can be integrated to implement the input and output functions of the terminal device. Details are not limited herein.

The interface unit 408 is an interface for connecting an external apparatus to the terminal device 400. For example, the external apparatus may include a wired or wireless headphone port, an external power supply (or a battery charger) port, a wired or wireless data port, a storage card port, a port for connecting an apparatus having an identification module, an audio input/output (I/O) port, a video I/O port, a headphone port, or the like. The interface unit 408 may be configured to receive input (for example, data information and power) from the external apparatus and transmit the received input to one or more elements in the terminal device 400, or may be configured to transmit data between the terminal device 400 and the external apparatus.

The memory 409 may be configured to store a software program and various data. The memory 409 may mainly include a program storage area and a data storage area. The program storage area may store an operating system, an application program required by at least one function (such as a sound playback function and an image display function), and the like. The data storage area may store data (such as audio data and a phone book) created based on use of the mobile phone, and the like. In addition, the memory 409 may include a high-speed random access memory or a nonvolatile memory, for example, at least one disk storage device, a flash memory, or another volatile solid-state storage device.

The processor 410 is a control center of the terminal device, is connected to each part of the entire terminal device by using various interfaces and lines, and performs various functions of the terminal device and data processing by running or executing the software program and/or the module that are/is stored in the memory 409 and invoking data stored in the memory 409, to perform overall monitoring on the terminal device. The processor 410 may include one or more processing units. Optionally, the processor 410 may integrate an application processor and a modem processor. The application processor mainly deals with an operating system, a user interface, an application program, and the like. The modem processor mainly deals with wireless communication. It may be understood that alternatively, the modem processor may not be integrated into the processor 410.

The terminal device 400 may further include the power supply 411 (such as a battery) supplying power to each component. Preferably, the power supply 411 may be logically connected to the processor 410 by using a power management system, so as to implement functions such as charging management, discharging management and power consumption management by using the power management system.

In addition, the terminal device 400 includes some functional modules that are not illustrated. Details are not described herein.

Optionally, an embodiment of the present disclosure further provides a terminal device, including a processor 410, a memory 409, and a computer program that is stored in the memory 409 and that can run on the processor 410. When the computer program is executed by the processor 410, processes of the foregoing random access method embodiment are implemented, and a same technical effect can be achieved. To avoid repetition, details are not described herein again.

An embodiment of the present disclosure further provides a computer-readable storage medium. A computer program is stored in the computer-readable storage medium. When being executed by a processor, the computer program implements each process of the embodiment of the foregoing random access method, and a same technical effect can be achieved. To avoid repetition, details are not described herein. The computer-readable storage medium is, for example, a read-only memory (Read-Only Memory, ROM for short), a random access memory (Random Access Memory, RAM for short), a magnetic disk, or an optical disk.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. Without being subject to further limitations, an element defined by a phrase "including a" does not exclude presence of other identical elements in the process, method, article, or apparatus that includes the very element.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. However, in many cases, the former is a preferred embodiment. Based on such an understanding, the technical solutions of the present disclosure essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the protection scope of aims of the present disclosure and claims, all of which fall within the protection of the present disclosure.

The invention claimed is:

1. A random access method, applied to a terminal device and comprising:
   buffering a first MAC PDU in a Message 3 (Msg3) buffer in a contention random access procedure;
   initiating a contention-free random access procedure in a case where the contention random access procedure fails;
   buffering a second Medium Access Control Protocol Data Unit (MAC PDU) in a Hybrid Automatic Repeat Request (HARQ) buffer in a case where a contention-free random access procedure is successful, wherein the second MAC PDU is a PDU that comprises at least data content of the first MAC PDU and is buffered in a target buffer, and the target buffer and the Msg3 buffer are different buffers;
   wherein after the buffering a second MAC PDU in a HARQ buffer, the method further comprises:
   transmitting the second MAC PDU to a network side device by using a HARQ procedure until a transmission stopping condition is met wherein the transmission stopping condition comprises the HARQ procedure is occupied by first data, wherein the first data is different from the second MAC PDU.

2. The method according to claim 1, wherein after the transmitting the second MAC PDU to a network side device by using a HARQ procedure until a transmission stopping condition is met, the method further comprises:
   in a case where the transmission stopping condition is met, flushing the second MAC PDU buffered in the HARQ buffer.

3. The method according to claim 1, wherein the transmission stopping condition further comprises at least one of the following:
   a response corresponding to HARQ transmission of a Msg3 is received; wherein the second MAC PDU is transmitted through the HARQ transmission of the Msg3; and
   a maximum HARQ transmission times of the Msg3 is reached.

4. The method according to claim 1, wherein before the buffering a second MAC PDU in a HARQ buffer, the method further comprises:
   generating the second MAC PDU based on the data content of the first MAC PDU; and
   storing the second MAC PDU in the target buffer.

5. The method according to claim 1, wherein before the buffering the second MAC PDU in the HARQ buffer, the method further comprises:
   where a random access request identifier indicated by a random access response corresponds to the random access request sent by the UE, considering that the contention-free random access procedure is completed.

6. A terminal device, comprising: a processor, a memory, and a computer program that is stored in the memory and that can run on the processor, wherein the computer program is executed by the processor to implement:
   buffering a first MAC PDU in a Message 3 (Msg3) buffer in a contention random access procedure;
   initiating a contention-free random access procedure in a case where the contention random access procedure fails;
   buffering a second Medium Access Control Protocol Data Unit (MAC PDU) in a Hybrid Automatic Repeat Request (HARQ) buffer in a case where a contention-free random access procedure is successful, wherein the second MAC PDU is a PDU that comprises at least data content of the first MAC PDU and is buffered in a target buffer, and the target buffer and the Msg3 buffer are different buffers;
   wherein the computer program is further executed by the processor to implement:
   after the buffering a second MAC PDU in a HARQ buffer, transmitting the second MAC PDU to a network side device by using a HARQ procedure until a transmission stopping condition is met; wherein the transmission stopping condition comprises the HARQ procedure is occupied by first data, wherein the first data is different from the second MAC PDU.

7. The terminal device according to claim 6, wherein the computer program is further executed by the processor to implement:
   after the transmitting the second MAC PDU to a network side device by using a HARQ procedure until a transmission stopping condition is met, in a case where the transmission stopping condition is met, flushing the second MAC PDU buffered in the HARQ buffer.

8. The terminal device according to claim 6, wherein the transmission stopping condition further comprises at least one of the following:
   a response corresponding to HARQ transmission of a Msg3 is received; wherein the second MAC PDU is transmitted through the HARQ transmission of the Msg3; and
   a maximum HARQ transmission times of the Msg3 is reached.

9. The terminal device according to claim 6, wherein the computer program is further executed by the processor to implement:
   generating the second MAC PDU based on the data content of the first MAC PDU before the buffering a second MAC PDU in a HARQ buffer; and
   storing the second MAC PDU in the target buffer.

10. The terminal device according to claim 6, wherein the computer program is further executed by the processor to implement:
   before the buffering the second MAC PDU in the HARQ buffer,
   in a case where a random access request identifier indicated by a random access response corresponds to the random access request sent by the UE, considering that the contention-free random access procedure is completed.

11. A non-transitory computer-readable storage medium, wherein the computer-readable storage medium stores a computer program, and the computer program is executed by a processor, to implement:
   buffering a first MAC PDU in a Message 3 (Msg3) buffer in a contention random access procedure;
   initiating a contention-free random access procedure in a case where the contention random access procedure fails;
   buffering a second Medium Access Control Protocol Data Unit (MAC PDU) in a Hybrid Automatic Repeat Request (HARQ) buffer in a case where a contention-free random access procedure is successful, wherein the second MAC PDU is a PDU that comprises at least data content of the first MAC PDU and is buffered in a target buffer, and the target buffer and the Msg3 buffer are different buffers;
   wherein the computer program is further executed by the processor to implement:
   after the buffering a second MAC PDU in a HARQ buffer, transmitting the second MAC PDU to a network side device by using a HARQ procedure until a transmission stopping condition is met; wherein the transmission stopping condition comprises the HARQ procedure is occupied by first data, wherein the first data is different from the second MAC PDU.

12. The non-transitory computer-readable storage medium according to claim 11, wherein the computer program is further executed by the processor to implement:
   after the transmitting the second MAC PDU to a network side device by using a HARQ procedure until a transmission stopping condition is met, in a case where the transmission stopping condition is met, flushing the second MAC PDU buffered in the HARQ buffer.

13. The non-transitory computer-readable storage medium according to claim 11, wherein the transmission stopping condition further comprises at least one of the following:
   a response corresponding to HARQ transmission of a Msg3 is received; wherein the second MAC PDU is transmitted through the HARQ transmission of the Msg3; and a maximum HARQ transmission times of the Msg3 is reached.

14. The non-transitory computer-readable storage medium according to claim 11, wherein the computer program is further executed by the processor to implement:
   generating the second MAC PDU based on the data content of the first MAC PDU before the buffering a second MAC PDU in a HARQ buffer; and
   storing the second MAC PDU in the target buffer.

15. The non-transitory computer-readable storage medium according to claim 11, wherein the computer program is further executed by the processor to implement:
   before the buffering the second MAC PDU in the HARQ buffer,
   in a case where a random access request identifier indicated by a random access response corresponds to the random access request sent by the UE, considering that the contention-free random access procedure is completed.

* * * * *